US008124193B2

(12) United States Patent
Belelie et al.

(10) Patent No.: US 8,124,193 B2
(45) Date of Patent: Feb. 28, 2012

(54) GLOSS CONTROL OF UV CURABLE FORMULATIONS THROUGH MICRO-PATTERNING

(75) Inventors: Jennifer L. Belelie, Oakville (CA); Michelle N. Chretien, Mississauga (CA); Barkev Keoshkerian, Thornhill (CA); Naveen Chopra, Oakville (CA); Peter G. Odell, Mississauga (CA); Christopher A. Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 481 days.

(21) Appl. No.: 12/400,238

(22) Filed: Mar. 9, 2009

(65) Prior Publication Data

US 2010/0227075 A1 Sep. 9, 2010

(51) Int. Cl.
*C08J 7/04* (2006.01)

(52) U.S. Cl. ........ 427/494; 427/487; 427/493; 427/495; 427/510; 427/511; 427/512; 427/514; 427/532; 427/553; 106/31.13; 522/1; 522/6; 347/100; 347/102; 430/135; 430/137.11

(58) Field of Classification Search .................. 427/487, 427/493, 495, 494, 510, 511, 512, 514, 532, 427/553; 522/1, 6; 106/31.13; 430/135, 430/137.11; 347/100, 102
See application file for complete search history.

(56) References Cited

U.S. PATENT DOCUMENTS

| | | | | |
|---|---|---|---|---|
| 6,819,886 | B2 | 11/2004 | Runkowske et al. | |
| 7,046,364 | B2 | 5/2006 | Schneider et al. | |
| 2002/0128340 | A1 * | 9/2002 | Young et al. | 522/1 |
| 2003/0158283 | A1 * | 8/2003 | Ylitalo et al. | 522/74 |
| 2004/0004731 | A1 | 1/2004 | Itagaki | |
| 2004/0137205 | A1 * | 7/2004 | MacQueen et al. | 428/204 |
| 2007/0142492 | A1 * | 6/2007 | Odell et al. | 522/74 |
| 2008/0000384 | A1 * | 1/2008 | Belelie et al. | 106/31.13 |
| 2008/0122914 | A1 * | 5/2008 | Toma et al. | 347/100 |

OTHER PUBLICATIONS

P. Ganahl et al., "Structured Illumination for Gloss Control of Photopolymerized Acrylate Coatings", Presentation at XRCC, Sep. 2008.

European Search Report issued Jun. 23, 2010 in EP 10 15 6000.

* cited by examiner

*Primary Examiner* — Charles Boyer
(74) *Attorney, Agent, or Firm* — Oliff & Berridge, PLC

(57) ABSTRACT

Methods of controlling gloss of an image are disclosed. The methods may include forming an image over a substrate by applying an ink composition and optionally an overcoat composition at least partially over the substrate. The ink composition or overcoat composition may include at least one gellant, at least one curable monomer, optionally at least one curable wax and optionally at least one photoinitiator. The ink composition or overcoat composition may be curable upon exposure to radiation. The methods may further include providing a micro-roughness to one or more portions of the ink composition or overcoat composition by non-uniformly curing the ink composition or overcoat composition, and flood curing the ink composition or overcoat composition to complete a cure. The methods may thereby provide a controlled gloss level to the image.

13 Claims, 1 Drawing Sheet

GLOSS CONTROL OF UV CURABLE FORMULATIONS THROUGH MICRO-PATTERNING

BACKGROUND

Described herein are methods of controlling gloss of an image through micro-patterning a radiation curable ink and/or overcoat by non-uniformly curing the ink and/or overcoat followed by flood curing the ink and/or overcoat.

The gloss control method herein provides several advantages, including permitting the gloss of the image to be controlled in a straightforward manner, and possibly without the need to use different compositions to achieve different gloss levels. Other advantages will be apparent from the description herein.

Many printing applications requiring variable gloss levels, such as photo publishing, are experiencing tremendous growth. As a result, the ability to control printed gloss levels is desirable. However, current printer products typically produce a generally narrow range of gloss, and the gloss level (matte, semi-gloss, gloss) is typically not adjustable by the customer.

In U.S. Pat. No. 7,046,364 to Schneider et al., disclosed is a method and apparatus for matching the gloss level of a printed image on a media substrate surface to the gloss level of an unprinted portion of the media substrate.

In U.S. Pat. No. 6,819,886 to Runkowske et al., disclosed is an on-line gloss/density meter to provide for gloss/density measurements of a marking particle image produced on a receiver member in an electrographic reproduction apparatus such that meaningful feedback for the reproduction apparatus can be obtained to control gloss/density of the reproduced image.

In U.S. Patent Application Publication No. 2004/0004731 to Itagaki, disclosed is an image processing apparatus and a control method for controlling glossiness of an image.

In co-pending Application Ser. No. 12/171,815 (entitled "Method of Controlling Gloss With Curing Atmosphere Using Radiation Curable Ink or Overcoat Compositions," Michelle N. Chrétien et al.), filed Jul. 11, 2008, described is a method of controlling gloss of an image through control of the atmosphere during curing of a radiation curable ink and/or overcoat. In co-pending Application Ser. No. 12/144,233 (entitled "Method of Controlling Gloss in UV Curable Overcoat Compositions," Jennifer L. Belelie et. al.), filed Jun. 23, 2008, described is a method of controlling gloss of an image by adjusting the amount of curable wax in the composition and/or by adjusting the amount of overcoat composition to apply.

SUMMARY

In embodiments, described is a method of controlling gloss of an image, comprising forming an image over a substrate by applying an ink composition and optionally an overcoat composition at least partially over the substrate, the ink composition or overcoat composition comprising at least one gellant, at least one curable monomer, optionally at least one curable wax and optionally at least one photoinitiator, wherein the ink composition or overcoat composition is curable upon exposure to radiation, providing a micro-roughness to one or more portions of the ink composition or overcoat composition by non-uniformly curing the ink composition or overcoat composition, and flood curing the ink composition or overcoat composition to complete a cure, thereby providing a gloss level to the image.

Also described is a method of controlling gloss of an image, comprising forming an image over a substrate by applying an ink composition and optionally an overcoat composition at least partially over the substrate, the ink composition or overcoat composition comprising at least one gellant, at least one curable monomer, optionally at least one curable wax and optionally at least one photoinitiator, wherein the ink composition or overcoat composition is curable upon exposure to radiation, providing a micro-roughness to one or more portions of the ink composition or overcoat composition by non-uniformly curing the ink composition or overcoat composition, wherein the non-uniform curing is achieved by transmitting radiation from an energy source through a mask having a plurality of openings to the ink composition or overcoat composition, the mask serving to at least one of block and scatter less than all of the radiation being transmitted from the energy source, and flood curing the ink composition or overcoat composition to complete a cure with radiation from the same or a different energy source, thereby providing a gloss level to the image.

Further described is a method of controlling gloss of an image, comprising forming an image over a substrate by applying an ink composition and optionally an overcoat composition at least partially over the substrate, the ink composition or overcoat composition comprising at least one gellant, at least one curable monomer, optionally at least one curable wax and optionally at least one photoinitiator, wherein the ink composition or overcoat composition is curable upon exposure to radiation, providing a micro-roughness to one or more portions of the ink composition or overcoat composition by non-uniformly curing the ink composition or overcoat composition, wherein the non-uniform curing is achieved by laser rastering, and flood curing the ink composition or overcoat composition to complete a cure, thereby providing a gloss level to the image.

Still further described is a method of controlling gloss of an image, comprising pre-selecting a desired gloss level for the image, forming the image over a substrate by digitally applying an ink composition and optionally an overcoat composition at least partially over the substrate by jetting the ink composition or overcoat composition comprising at least one gellant, at least one curable monomer, optionally at least one curable wax and optionally at least one photoinitiator, wherein the ink composition or overcoat composition is curable upon exposure to ultraviolet radiation, providing a micro-roughness to one or more portions of the ink composition or overcoat composition by non-uniformly curing the ink composition or overcoat composition, the non-uniform curing being achieved by non-uniformly applying ultraviolet radiation to the ink composition or overcoat composition, and flood curing the ink composition or overcoat composition to complete a cure, thereby providing a gloss level to the image substantially equal to the desired gloss level for the image.

Yet further described is an image having a controlled gloss, the image comprising a cured ink composition or overcoat composition over one or more portions of a substrate, the ink composition or overcoat composition comprising micro-rough surfaces formed on one or more portions of the ink composition or overcoat composition to provide a micro-pattern, wherein the ink composition or overcoat composition comprises at least one gellant, at least one curable monomer, optionally at least one curable wax and optionally at least one photoinitiator.

EMBODIMENTS

Figure 1:
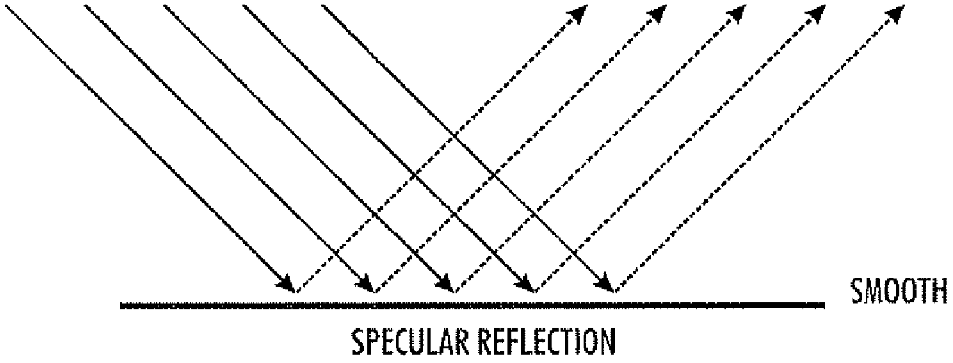
FIG. 1 depicts specular reflection on a smooth surface.

Described are methods of controlling gloss of an image with a radiation curable colored composition, for example a colored ink composition, and/or with a radiation curable colorless composition, for example a colorless ink such as used in security applications and/or a colorless overcoat composition, through imparting a micro-pattern to the curable composition, in which the curable composition is at least partially applied over an image receiving substrate, by providing micro-roughness to one or more portions of the curable composition.

Micro-roughness refers to surfaces marked by irregularities and/or protuberances imperceptible to normal and unaided human sight and touch, which surfaces are capable of diffuse reflection of light. Micro-pattern, or micro-patterning, refers to an irregular (e.g., random) or regular pattern, or patterning, of one or more surfaces characterized by micro-roughness. Through imparting a micro-pattern to curable composition associated with an end image formed on a substrate by non-uniformly curing the composition followed by flood curing of the composition, the end image may be made to have a gloss level substantially equal to a desired gloss level, for example a desired gloss level determined prior to formation of the image, and different from a gloss level otherwise obtained by curing the composition without imparting a micro-pattern thereto. Substantially equal gloss level refers to, for example, the gloss level of the image being within about 5% of the desired gloss level. The control of the gloss level via micro-patterning is believed to be at least somewhat associated with the composition of the colored or colorless composition.

The colored or colorless composition is comprised of at least one gellant, at least one curable monomer, optionally at least one curable wax and optionally at least one photoinitiator. For a colored composition, the composition further includes at least one colorant, such as a pigment, dye, mixture of pigments, mixture of dyes, or mixture of pigments and dyes, present in an amount of about 0.5% to about 15% by weight of the composition, such as from about 1% to about 10% by weight of the composition. For colorless compositions, the composition is substantially free of colorant, including completely free of colorant. An overcoat composition is desirably substantially free of colorant.

The composition is a radiation curable, particularly a UV curable, composition comprising at least one gellant, at least one curable monomer, optionally at least one curable wax, and optionally at least one photoinitiator. The composition may also optionally include a stabilizer, a surfactant, or other additives.

The composition may be applied at temperatures of from about 50° C. to about 120° C., such as from about 70° C. to about 90° C. At application temperatures, the composition may have a viscosity of from about 5 to about 16 cPs, such as from about 8 to 13 cPs. Viscosity values set forth herein are obtained using the cone and plate technique, at a shear rate of 1 $s^{-1}$. The compositions are thus well suited for use in devices in which the composition can be digitally applied, such as applied via ink jets. The compositions may also be applied by other methods, including offset printing techniques.

The at least one gellant, or gelling agent, functions at least to increase the viscosity of the composition within a desired temperature range. For example, the gellant forms a solid-like gel in the composition at temperatures below the gel point of the gellant, for example below the temperature at which the composition is applied. For example, the composition ranges in viscosity from about $10^3$ to about $10^7$ cPs, such as from about $10^{3.5}$ to about $10^{6.5}$ cPs, in the solid-like phase. The gel phase typically comprises a solid-like phase and a liquid phase in coexistence, wherein the solid-like phase forms a three-dimensional network structure throughout the liquid phase and prevents the liquid phase from flowing at a macroscopic level. The composition exhibits a thermally reversible transition between the gel state and the liquid state when the temperature is varied above or below the gel point of the composition. This temperature is generally referred to as a sol-gel temperature. This cycle of gel reformation can be repeated a number of times, since the gel is formed by physical, non-covalent interactions between the gelling agent molecules, such as hydrogen bonding, aromatic interactions, ionic bonding, coordination bonding, London dispersion interactions, or the like.

The temperature at which the composition is in gel state is, for example, approximately from about 15° C. to about 60° C., such as from about 15° C. to about 55° C. The gel composition may liquefy at temperatures of from about 60° C. to about 100° C., such as from about 70° C. to about 90° C. In cooling from the application temperature liquid state to the gel state, the composition undergoes a significant viscosity increase. The viscosity increase is at least a three orders of magnitude increase in viscosity, such as at least a four order of magnitude increase in viscosity.

Gellants suitable for use in the radiation curable compositions include a curable gellant comprised of a curable amide, a curable polyamide-epoxy acrylate component and a polyamide component, a curable composite gellant comprised of a curable epoxy resin and a polyamide resin, mixtures thereof and the like. Inclusion of the gellant in the composition permits the composition to be applied over a substrate, such as on one or more portions of the substrate and/or on one or more portions of an image previously formed on the substrate, without excessive penetration into the substrate because the viscosity of the composition is quickly increased as the composition cools following application. Excessive penetration of a liquid into a porous substrate such as paper can lead to an undesirable decrease in the substrate opacity. The curable gellant may also participate in the curing of monomer(s) of the composition.

The gellants suitable for use in the composition may be amphiphilic in nature in order to improve wetting when the composition is utilized over a substrate having silicone or other oil thereon. Amphiphilic refers to molecules that have both polar and non-polar parts of the molecule. For example, the gellants may have long non-polar hydrocarbon chains and polar amide linkages.

Amide gellants suitable for use include those described in U.S. Pat. Nos. 7,276,614 and 7,279,587, the entire disclosures of which are incorporated herein by reference.

As described in U.S. Pat. No. 7,279,587, the amide gellant may be a compound of the formula

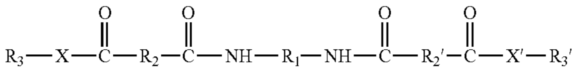

wherein:

$R_1$ is:

(i) an alkylene group (wherein an alkylene group is a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, although the number of carbon atoms can be outside of these ranges, (ii) an arylene group (wherein an arylene group is a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, although the number of carbon atoms can be outside of these ranges, (iii) an arylalkylene group (wherein an arylalkylene group is a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, although the number of carbon atoms can be outside of these ranges, or (iv) an alkylarylene group (wherein an alkylarylene group is a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2$' each, independently of the other, are:

(i) alkylene groups having from about 1 carbon atom to about 54 carbon atoms, such as from about 1 carbon atom to about 48 carbon atoms or from about 1 carbon atom to about 36 carbon atoms, although the number of carbon atoms can be outside of these ranges, (ii) arylene groups having from about 5 carbon atoms to about 15 carbon atoms, such as from about 5 carbon atoms to about 13 carbon atoms or from about 5 carbon atoms to about 10 carbon atoms, although the number of carbon atoms can be outside of these ranges, (iii) arylalkylene groups having from about 6 carbon atoms to about 32 carbon atoms, such as from about 7 carbon atoms to about 33 carbon atoms or from about 8 carbon atoms to about 15 carbon atoms, although the number of carbon atoms can be outside of these ranges, or (iv) alkylarylene groups having from about 6 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups may be halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, and wherein two or more substituents may be joined together to form a ring;

$R_3$ and $R_3$' each, independently of the other, are either:

(a) photoinitiating groups, such as groups derived from 1-(4-(2-hydroxyethoxy)phenyl)-2-hydroxy-2-methylpropan-1-one, of the formula

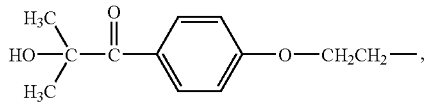

groups derived from 1-hydroxycyclohexylphenylketone, of the formula

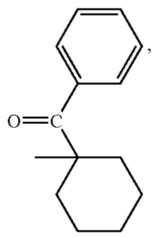

groups derived from 2-hydroxy-2-methyl-1-phenylpropan-1-one, of the formula

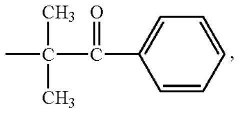

groups derived from N,N-dimethylethanolamine or N,N-dimethylethylenediamine, of the formula

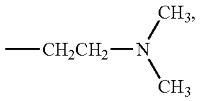

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, such as tolyl or the like, wherein the substituents on the substituted alkyl, arylalkyl, and alkylaryl groups may be halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof and the like, and wherein two or more substituents may be joined together to form a ring;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, (iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, (iv) an arylalkyl group, including substituted and unsubstituted arylalkyl groups, wherein the alkyl portion of the arylalkyl group may be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, wherein the substituents on the substituted alkyl, aryl, arylalkyl, and alkylaryl groups may be halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, and wherein two or more substituents may be joined together to form a ring.

Specific suitable substituents and gellants of the above are further set forth in U.S. Pat. Nos. 7,279,587 and 7,276,614, incorporated herein by reference, and thus are not further detailed herein.

In embodiments, the gellant may comprise a mixture comprising:

(I)

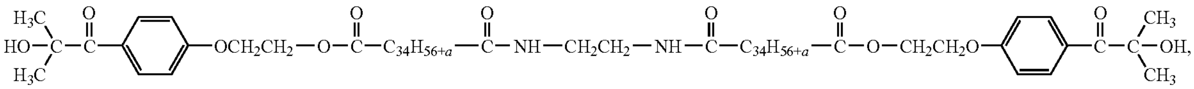

(II)

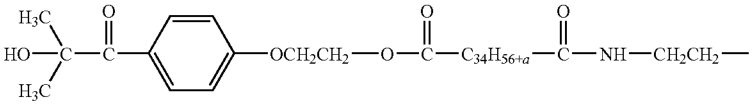

-continued

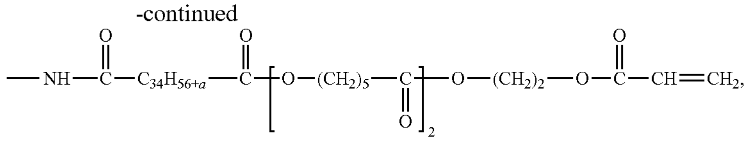

and (III)

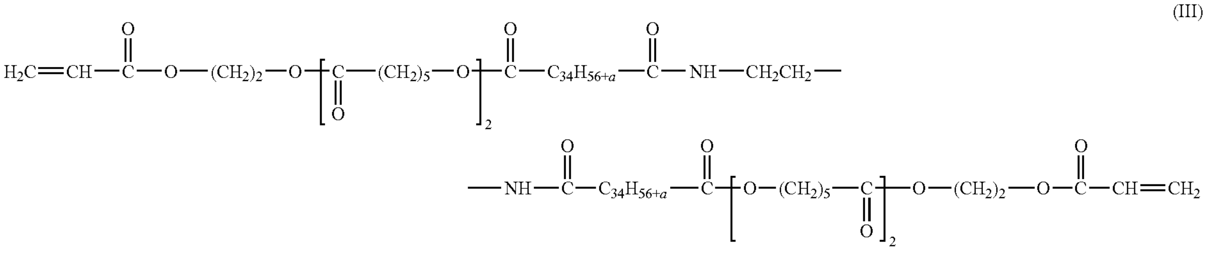

wherein $—C_{34}H_{56+a}—$ represents a branched alkylene group which may include unsaturations and cyclic groups, wherein a is an integer of 0, 1, 2, 3, 4, 5, 6, 7, 8, 9, 10, 11, or 12.

In embodiments, the gellant may be a composite gellant, for example comprised of a curable epoxy resin and a polyamide resin. Suitable composite gellants are described in commonly assigned U.S. Patent Application Publication No. 2007/0120921, the entire disclosure of which is incorporated herein by reference.

The epoxy resin component in the composite gellant can be any suitable epoxy group-containing material. In embodiments, the epoxy group containing component includes the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of about 200 to about 800, such as about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth) acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

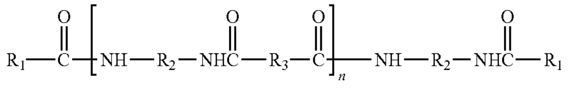

wherein $R_1$ is an alkyl group having at least seventeen carbons, $R_2$ includes a polyalkyleneoxide, $R_3$ includes a C-6 carbocyclic group, and n is an integer of at least 1.

The gellant may also comprise a curable polyamide-epoxy acrylate component and a polyamide component, such as disclosed, for example, in commonly assigned U.S. Patent Application Publication No. 2007/0120924, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin.

The composition may include the gellant in any suitable amount, such as about 1% to about 50% by weight of the composition. In embodiments, the gellant may be present in an amount of about 2% to about 20% by weight of the composition, such as about 3% to about 10% by weight of the composition, although the value can also be outside of this range.

Examples of the at least one curable monomer of the composition include propoxylated neopentyl glycol diacrylate (such as SR-9003 from Sartomer), diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, butyl acrylate, mixtures thereof and the like.

The term "curable monomer" is also intended to encompass curable oligomers, which may also be used in the composition. Examples of suitable radiation curable oligomers that may be used in the compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., PHOTOMER 3660, PHOTOMER 5006F, PHOTOMER 5429, PHOTOMER 5429F, available from Cognis Corporation, Cincinnati, Ohio, LAROMER PO 33F, LAROMER PO 43F, LAROMER PO 94F, LAROMER UO 35D, LAROMER PA 9039V, LAROMER PO 9026V, LAROMER 8996, LAROMER 8765, LAROMER 8986, available from BASF Corporation, Florham Park, N.J., and the like.

In embodiments, the curable monomer includes both a propoxylated neopentyl glycol diacrylate (such as SR-9003 from Sartomer) and a dipentaerythritol pentaacrylate (such as SR399LV from Sartomer). The inclusion of the pentaacrylate is advantageous in providing more functionality, and thus more reactivity, compared to the diacrylate. However, the amount of the pentaacrylate needs to be limited in the composition as too much can adversely affect the viscosity of the composition at application temperatures. The pentaacrylate thus makes up 10% by weight or less of the composition, such as 0.5 to 5% by weight of the composition.

The curable monomer may be included in the composition in an amount of, for example, about 20 to about 95% by weight of the composition, such as about 30 to about 85% by weight of the composition, or about 40 to about 80% by weight of the composition.

The composition may optionally further include at least one photoinitiator for initiating curing, for example UV curing. Any photoinitiator that absorbs radiation, for example UV light radiation, to initiate curing of the curable components of the formulation may be used, although it is desirable if the photoinitiator does not substantially produce a yellow coloration upon cure.

Examples of free-radical photoinitiators, suitable for use with compositions including acrylate and/or amide groups, include benzophenones, benzoin ethers, benzil ketals, α-hydroxyalkylphenones, and acylphosphine photoinitiators, such as sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-hydroxy-1-(4-(4-(2-hydroxy-2-methylpropionyl)-benzyl)-phenyl)-2-methylpropan-1-one (Ciba IRGACURE 127); titanocenes; isopropylthioxanthone (ITX); 1-hydroxy-cyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof.

An amine synergist, that is, co-initiators that donate a hydrogen atom to a photoinitiator and thereby form a radical species that initiates polymerization (amine synergists can also consume oxygen dissolved in the formulation—as oxygen inhibits free-radical polymerization its consumption increases the speed of polymerization), for example such as ethyl-4-dimethylaminobenzoate and 2-ethylhexyl-4-dimethylaminobenzoate, may also be included.

In embodiments, the photoinitiator package may include at least one alpha-hydroxy ketone photoinitiator and at least one phosphinoyl type photoinitiator(s). One example of the alpha-hydroxy ketone photoinitiator is IRGACURE 127, while one example of the phosphinoyl type photoinitiator is IRGACURE 819. The ratio of the alpha-hydroxy ketone photoinitiator to the phosphinoyl type photoinitiator may be, for example, from about 90:10 to about 10:90, such as from about 80:20 to about 20:80 or from about 70:30 to about 30:70.

The total amount of photoinitiator included in the composition may be, for example, from about 0 to about 15%, such as from about 0.5 to about 10%, by weight of the composition. In embodiments, the composition may be free of photoinitiators, for example where e-beam radiation is used as the curing energy source.

The composition may optionally further include at least one curable wax. A wax is solid at room temperature, specifically at 25° C. Inclusion of the wax thus may promote an increase in viscosity of the composition as it cools from the application temperature. Thus, the wax may also assist the gellant in avoiding bleeding of the composition through the substrate.

The curable wax may be any wax component that is miscible with the other components and that will polymerize with the curable monomer to form a polymer. The term wax includes, for example, any of the various natural, modified natural, and synthetic materials commonly referred to as waxes.

Suitable examples of curable waxes include those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl. The curable waxes described herein may be cured with the disclosed monomer(s).

Suitable examples of hydroxyl-terminated polyethylene waxes that may be functionalized with a curable group include, but are not limited to, mixtures of carbon chains with the structure $CH_3—(CH_2)_n—CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

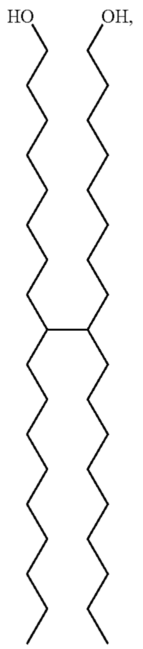

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference, may also be used. These alcohols can be reacted with carboxylic acids equipped with UV curable moieties to form reactive esters. Examples of these acids include acrylic and methacrylic acids, available from Sigma-Aldrich Co.

Suitable examples of carboxylic acid-terminated polyethylene waxes that may be functionalized with a curable group include mixtures of carbon chains with the structure $CH_3-(CH_2)_n-COOH$, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

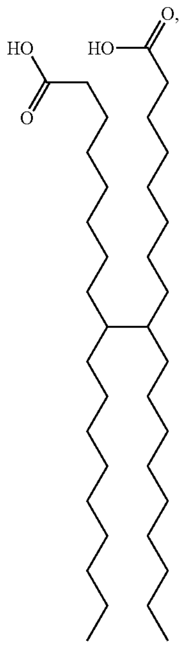

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference, can also be used. These carboxylic acids can be reacted with alcohols equipped with UV curable moieties to form reactive esters. Examples of these alcohols include, but are not limited to, 2-allyloxyethanol from Sigma-Aldrich Co.;

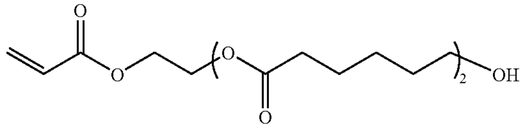

SR495B from Sartomer Company, Inc.;

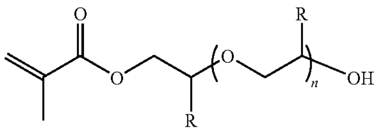

CD572 (R=H, n=10) and SR604 (R=Me, n=4) from Sartomer Company, Inc.

The curable wax can be included in the composition in an amount of from, for example, about 0.1% to about 30% by weight of the composition, such as from about 0.5% to about 20% or from about 0.5% to 15% by weight of the composition.

The composition may also optionally contain an antioxidant stabilizer. The optional antioxidants of the compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

The composition may further optionally include conventional additives to take advantage of the known functionality associated with such conventional additives. Such additives may include, for example, defoamers, surfactants, slip and leveling agents, etc.

The composition desirably does not yellow upon curing, with little to no measurable difference in any of L* a* b* values or k, c, m, y being observed. Being "substantially non-yellowing" refers to the composition changing color or hue upon curing in an amount of less than about 15%, such as less than about 10% or less than about 5%, for example about 0%.

In embodiments, the composition described herein may be prepared by mixing the composition components such as the curable monomer, optional curable wax, gellant and optional colorant at a temperature of from about 75° C. to about 120° C., such as from about 80° C. to about 110° C. or from about 75° C. to about 100° C., until homogenous, for example for from about 0.1 hour to about 3 hours, such as about 2 hours. Once the mixture is homogenous, then any photoinitiator may be added. Alternatively, all of the components of the composition may be combined immediately and mixed together.

In the methods of controlling gloss with an above described composition, a micro-pattern is imparted to the composition by providing micro-roughness to one or more portions of the composition, which composition is at least partially applied over the substrate, by non-uniformly curing the composition followed by flood curing of the composition to complete the cure. The degree and extent of micro-roughness provided to one or more portions of the composition may be controlled to allow a user to select from various levels of gloss (e.g., from matte finish to high-gloss finish) to provide a gloss level to the printed image formed over the substrate substantially equal to a desired gloss level.

Control, in this regard, requires that the degree and extent of micro-roughness provided to one or more portions of the composition, and/or the degree and extent of micro-patterning resulting from providing the micro-roughness to those portions, be pre-selected on the basis of a desired end gloss to be obtained in an image formed using the composition, and the gloss level obtained for the image be substantially equal to the pre-selected amount, for example within about 5% of the pre-selected amount.

Figure 2:
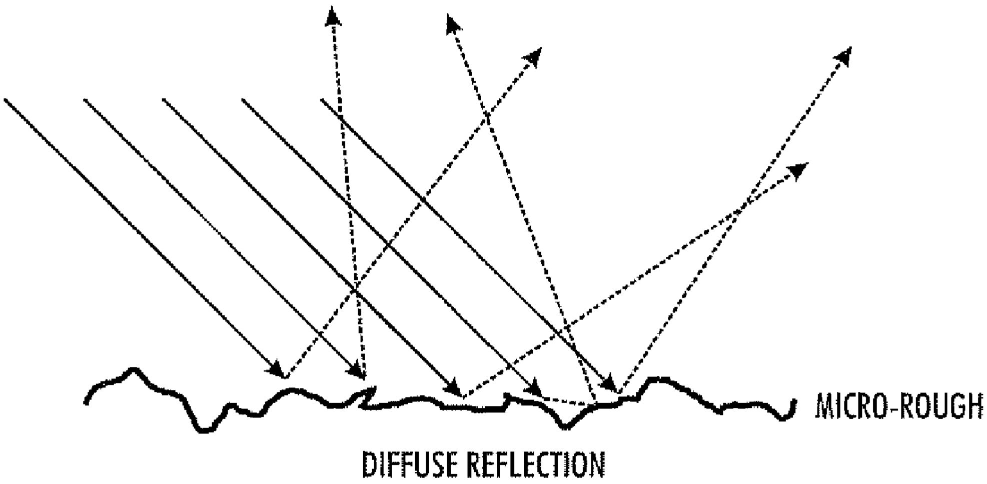
FIG. 2 depicts diffuse reflection on a surface provided with micro-roughness.

By providing micro-roughness to one or more portions of the composition applied at least partially over the substrate, surfaces capable of diffuse reflection of light are provided. As depicted in FIG. 2, diffuse reflection of light by a surface provided with micro-roughness reduces the gloss of the surface because light is reflected less efficiently than is achieved by specular reflection of light by a smooth surface as depicted in FIG. 1. Without micro-patterning or otherwise manipulating gloss, the compositions described above, such as UV curable gel ink and overcoat compositions, typically cure to a high-gloss finish. Because it is sometimes desirable to cure to reduced gloss finishes, such as semi-gloss and matte finishes, micro-patterning may be imparted to such compositions to reduce gloss, for example, to a desired gloss level.

Micro-patterning may be achieved by transmitting radiation (curing energy) from an energy source through a mask having a plurality of openings, such as a mesh mask, to the curable composition. The mask serves to prevent the radiation from uniformly curing the curable composition because radiation is blocked and/or scattered so as not to reach some locations on the curable composition whereas the radiation that is not blocked and/or scattered away from the composition is able to cure other locations of the curable composition. Thus, this non-uniform curing results in micro-roughness at portions of the composition imparting micro-patterning to the composition as a whole.

The mask is selected to have suitably sized openings to produce non-uniform curing. For example, if the openings are too large, then not enough radiation will be blocked and/or scattered resulting in a full and uniform cure effectively as achieved by flood curing. On the other hand, if the openings are too small, then too much radiation will be blocked and/or scattered resulting in little non-uniform curing within a substantially non-cured composition and, thus, inadequate micro-roughness. Upon flood curing, the micro-roughness imparted to the composition will be insufficient to reduce the gloss level of an end image to a gloss level substantially equal to a desired gloss level.

In some embodiments, the mesh masks have a plurality of openings having a diameter of less than about 250 μm, such as from about 80 μm to about 250 μm. In some embodiments, the mesh masks have a plurality of openings having a diameter from about 80 μm to about 150 μm. In some embodiments, the mesh masks have a plurality of openings having a diameter from about 90 μm to about 140 μm. In some embodiments, the mesh masks have a plurality of openings having a diameter from about 100 μm to about 130 μm. In some embodiments, curing a composition with a mesh mask having a plurality of openings of about 250 μm in diameter or greater results in inadequate non-uniform curing because the openings are too large to sufficiently block and/or scatter radiation, resulting in a full and uniform cure effectively as achieved by flood curing. Because the openings are not necessarily circular, but may be any shape, such as a square, rectangle, or ellipse, a length traversing the shape may be considered a "diameter."

For example, the openings may be square in shape, or at least resemble a square in shape, and may impart a micro-pattern to the composition that may comprise and/or resemble repeating squares. In selecting masks for use in providing a micro-roughness to one or more portions of the composition, the area of the openings may be an important factor. The ratio of the diameter of the mesh opening to the diameter of the wire may also be an important factor. In some embodiments, the ratio of the diameter of the mesh opening to the diameter of the wire may be approximately 1.4.

In embodiments, a mask may have a plurality of openings of substantially the same size and/or shape. In embodiments, a plurality of mesh masks may be available for selection. Each mask having a plurality of openings of substantially the same size and shape, which openings of each mask differ in size, shape and/or number from other masks available for selection. Each mask may be configured and selected to impart a level of gloss (for example, gloss, stain or matte) to an image different than that of the other masks. Each mask may achieve this by providing micro-roughness to one or more portions of the composition to a different degree and/or extent. In other embodiments, more than one mask having openings of the same or different size and/or shape may be used in conjunction to provide micro-roughness to one or more portions of the composition to a degree and/or extent and, thus, impart a level a gloss to an image, which level of gloss may be different than that of the same masks used separately or other masks used separately or together. For example, the masks may be stacked or offset to affect the amount of radiation scattered and/or blocked and, thus, the overall micro-pattern imparted to the composition.

For example, a mesh mask having a plurality of openings sized at about 80 μm in diameter may be used to control gloss of an image in accordance with a first reduced gloss level; a mesh mask having a plurality of openings sized at about 100 μm in diameter may be used to control gloss of an image in accordance with a second reduced gloss level (less glossy than the first reduced gloss level); a mesh mask having a plurality of openings sized at about 120 μm in diameter may be used to control gloss of an image in accordance with a third reduced gloss level (less glossy than the second reduced gloss level); and so on until, for example, a mesh mask having a plurality of openings sized at about 150 μm in diameter controls the gloss of an image in accordance with final reduced gloss level. Any masks having openings sized there between may also be used in embodiments. Also, less than all of such masks may be made available for selection depending on the range of gloss levels and levels within such range desired to be made available in embodiments. For example, two to four masks, such as three masks, may be provided in a printer for providing two to four reduced gloss levels, such as three reduced gloss levels, in addition to an unreduced gloss level obtained without effectuating non-uniform curing.

In other embodiments, the micro-pattern may be imparted digitally to provide increased latitude with respect to gloss levels. For example, rastering of a continuous wave or pulsed laser may be used to perform non-uniform curing of a curable composition and, thus, provide micro-roughness to one or more portions of the composition. That is, rastering of a continuous wave or pulsed laser may be used to provide a digitally controlled micro-pattern to a curable composition. The degree and/or extent of laser rastering and, thus, the degree and/or extent of non-uniform curing may be controllable to impart different degrees and extents of micro-roughness to compositions. The portions of the composition that the laser rastering is provided to may be controllable. That is, the level of gloss provided to the image may be controllable through the degree, extent and/or location of laser rastering selected to be provided to the composition and, thus, laser rastering may provide several reduced gloss levels for selection. Flood curing may also used to complete the cure after selective laser curing. Any other methods or means for providing non-uniform curing known or later devised by those skilled in the art may be used in embodiments to impart a micro-pattern to a curable composition.

In embodiments, controlling the micro-patterning of the curable composition may comprise providing desired gloss data to a database including one or more lookup tables for the curable composition, wherein the one or more lookup tables comprise data on the gloss provided by the composition using different micro-patterns formed by providing different degrees and/or extents of micro-roughness to one or more portions of the curable composition. This method may be used to determine the degree and/or extent of micro-roughness to be provided to one or more portions of the composition and the resulting degree and/or extent of micro-patterning imparted to the composition as a whole to achieve the desired gloss. The parameters for non-uniformly curing the curable composition can then be set, and thus an end image with a gloss level substantially equal to the desired gloss level may be obtained. For example, in embodiments, a suitable mask having a plurality of openings may be determined and selected to effectuate non-uniform curing of the curable composition at least partially applied over the substrate by blocking and/or scattering radiation from an energy source followed by flood curing from the same or different energy source to complete the cure and to obtain a gloss level for an image substantially equal to a desired (pre-selected) gloss level for that image.

Information for various lookup tables may be included in the database, from which a computing device, such as a computer, may determine the parameters for non-uniformly curing the curable composition necessary to achieve a gloss level substantially equal to a desired gloss level, which determination may then be used to set the parameter for non-uniformly curing the curable composition.

The composition may be applied directly onto the image receiving substrate, such as done with ink compositions, and/or may be applied directly onto an image previously formed on the image receiving substrate, such as done with overcoat compositions. In this regard, the overcoat composition may be applied (1) over portions of (a portion being less than all) or all of at least one printed image formed on the substrate, (2) over one or more portions of the substrate, and over less than all printable portions of the substrate (a printable portion being that portion of a substrate to which a printing device is capable of providing an image), or (3) over substantially all to all printable portions of the substrate when the composition is applied to less than all portions of a substrate or an image on the substrate, an end image with variable gloss characteristics can be obtained.

When the composition is coated onto an image, parts thereof, substrate, and/or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimaged areas of the substrate. The typical composition deposition level is in an amount of from about 5 to about 50 picoliters drop size. The composition can be applied in at least one pass over the image at any stage in the image formation using any known ink jet printing technique, such as, for example, drop-on-demand ink jet printing including, but not limited to, piezoelectric and acoustic ink jet printing. The application of the composition can be controlled with information used to form an image such that only one digital file is needed to produce the image and the overcoat composition. Thus, the composition may be fully digital.

Following application of the composition, the composition may optionally be leveled by contact or non-contact leveling, for example as disclosed in U.S. patent application Ser. No. 12/023,979, filed Jan. 31, 2008, incorporated herein by reference in its entirety.

Following application, the applied composition is typically cooled to below the gel point of the composition in order to take advantage of the properties of the gelling agent. The composition may then be non-uniformly cured by curing less than all locations of the curable composition, followed by flood curing to complete the cure, as described above. Curing at a location is achieved upon exposure to a suitable source of curing energy, for example, ultraviolet light. The photoinitiator absorbs the energy and sets into motion a reaction that converts the gel-like composition into a cured material. The viscosity of the of the composition further increases upon exposure of a suitable source of curing energy, such that it hardens to a solid. The monomer and wax, and optionally the gellant, in the composition contain functional groups that polymerize as a result of exposure to e-beam or ultraviolet radiation. This polymer network provides printed images with, for example, durability, thermal and light stability, and scratch and smear resistance. The end image derived can be made to have a gloss substantially equal to the desired gloss as described above.

The energy source used to initiate crosslinking of the radiation curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like.

Ultraviolet radiation, especially from a medium pressure mercury lamp with a high speed conveyor under UV light, for example, about 20 to about 150 m/min, may be desired, wherein the UV radiation is provided at a wavelength of about 200 to about 500 nm for about less than one second. In embodiments, the speed of the high speed conveyor is about 15 to about 80 m/min under UV light at a wavelength of about 200 to about 450 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, a filter to remove selected wavelengths (IR for example), and a cooling system to remove heat from the UV light source.

The substrate employed can be any appropriate substrate depending upon the end use of the print. Exemplary substrates include plain paper, coated paper, plastics, polymeric films, treated celluloses, wood, xerographic substrates, ceramics, fibers, metals and mixtures thereof, optionally comprising additives coated thereon.

When using a colored composition to form the image, the image may be partially or fully overcoated with an overcoat composition. The overcoat composition can be the colorless composition described above, or may be another conventional or suitable overcoat composition. This overcoat composition can further be used to alter the end gloss of the image, if desired.

The methods herein thus offer control over the gloss of the end image without requiring use of different compositions of a composition. Of course, use of a device containing multiple different compositions, for example including both colored and colorless compositions, compositions of different colors, or compositions capable of providing different ranges of glosses when non-uniformly cured by providing a degree and/or extent of micro-roughness to the one or more portions of the compositions as described above, may be used.

As described above, in embodiments, the methods of controlling gloss described herein may be applied to ink jetting devices. Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In continuous stream inkjet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a substrate. In drop-on-demand systems, a droplet is expelled from an orifice directly to a position on a substrate in accordance with digital data signals. A droplet is not formed or expelled unless it is to be placed on the substrate.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

The disclosure will be illustrated further in the following Example.

EXAMPLE 1

A colored ink composition was prepared by mixing each of the components indicated in Table 1.

TABLE 1

| COMPONENT | wt. % |
|---|---|
| Curable amide gellant | 7.5 |
| Unilin 350-acrylate | 5.0 |
| SR399LV pentafunctional acrylate monomer | 5.0 |
| SR9003 difunctional acrylate monomer | 52.8 |
| Irgacure 379 | 3 |
| Irgacure 819 | 1 |
| Irgacure 127 | 3.5 |
| Darocur ITX | 2 |
| Irgastab UV stabilizer | 0.2 |
| Cyan pigment dispersion, 15 wt. % | 20 |

The curable amide gellant is a mixture comprising:

(I)

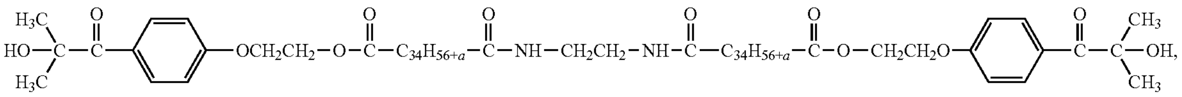

(II)

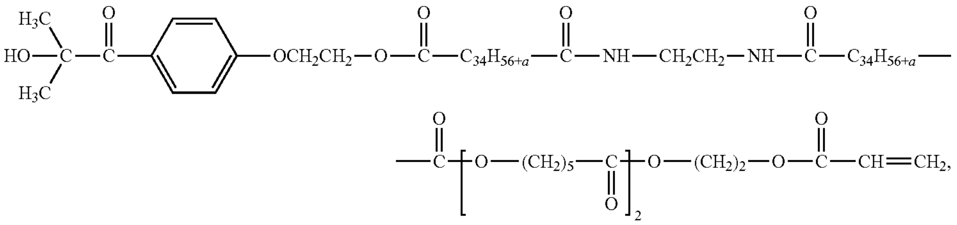

and (III)

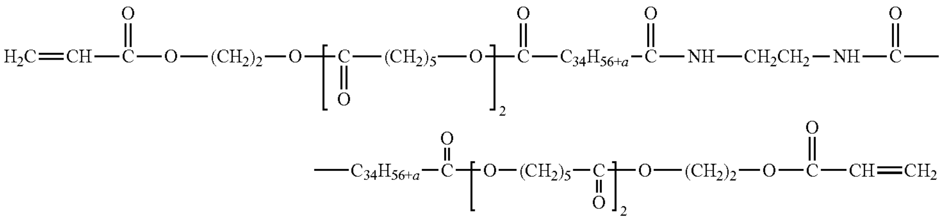

wherein —$C_{34}H_{56+a}$— represents a branched alkylene group which may include unsaturations and cyclic groups, wherein a is variously an integer of 0, 1, 2, 3, 4, 5, 6, 7, 8, 9, 10, 11, or 12, as described above.

Solid fill prints on transparencies were generated digitally from a modified PHASER® 860 printer. To micro-pattern the images, the prints were cured using a UV Fusion Lighthammer 6 device at 32 fpm (feet per minute) through wire meshes having differently sized openings, each wire mesh respectively having openings of substantially the same size and shape (i.e., about 80 μm in diameter, about 150 μm in diameter, and about 250 μm in diameter, respectively). All wire meshes had openings that were square in shape and the ratio of the diameter of the opening to the diameter of the wire was approximately 1.4. The prints were then flood cured with no mask in place to complete the cure. The gloss of the prints were measured using a micro-TRI-gloss meter from BYK Gardner at geometries of 60° and 20°. At least 5 measurements were taken at each geometry and averaged. The results are summarized in Table 2.

TABLE 2

| Mesh Opening (μm) | Gloss Measurement (ggu) 60° | 20° |
|---|---|---|
| No mesh | 69.4 | 30.0 |
| 80 | 56.5 | 16.2 |
| 150 | 40.0 | 17.3 |
| 250 | 71.4 | 29.0 |

As indicated by the results of Table 2, the amount of gloss reduction depends upon the degree and extent of micro-roughness provided to the surface of the ink composition, which is a function of the size of the mesh openings. The meshes having openings of about 80 μm in diameter and about 150 μm in diameter, respectively, reduced the gloss of the image as compared to the gloss of an image obtained when no mesh was used. The mesh having openings of about 150 μm in diameter reduced the gloss at the 60° geometry to a greater extent than did the mesh having an opening of about 80 μm in diameter. However, no significant effect on gloss level was observed with the mesh having openings of about 250 μm in diameter as compared to the gloss of an image obtained when no mesh was used.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of varying gloss of an image, comprising:

forming the image over a substrate by applying an ink composition and optionally an overcoat composition at least partially over the substrate, the ink composition or overcoat composition comprising at least one gellant, at least one curable monomer, optionally at least one curable wax and optionally at least one photoinitiator, wherein the ink composition or overcoat composition is curable upon exposure to radiation;

digitally providing a micro-roughness to one or more portions of the ink composition or overcoat composition by non-uniformly curing the ink composition or overcoat composition; and flood curing the ink composition or overcoat composition to complete a cure.

2. The method according to claim 1, further comprising:

pre-selecting a desired gloss level for the image before forming the image over the substrate, wherein the gloss level provided to the image is substantially equal to the desired gloss level for the image.

3. The method according to claim 1, wherein the ink composition and optionally the overcoat composition is digitally applied at least partially over the substrate by jetting.

4. The method according to claim 1, wherein the ink composition or overcoat composition is curable upon exposure to ultraviolet radiation and the non-uniform curing is achieved by non-uniformly applying ultraviolet radiation to the ink composition or overcoat composition.

5. The method according to claim 1, wherein the ink composition or overcoat composition is an ultraviolet radiation curable phase change composition.

6. The method according to claim 1, wherein the non-uniform curing is achieved by rastering a pulsed or continuous wave laser.

7. The method according to claim 1, further comprising:

providing desired gloss data to a database before forming the image over the substrate, the database comprising one or more lookup tables for the curable composition, wherein the one or more lookup tables comprise data on the gloss provided by the composition using different micro-patterns formed by providing different degrees and/or extents of micro-roughness to one or more portions of the curable composition.

8. The method according to claim 1, wherein:

the at least one curable monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, isobornyl methacrylate, lauryl acrylate, lauryl methacrylate, isodecylmethacrylate, propoxylated glycerol triacrylate, lauryl acrylate, neopentyl glycol propoxylate methylether monoacrylate, caprolactone acrylate, 2-phenoxyethyl acrylate, isooctylacrylate, isooctylmethacrylate, butyl acrylate, and mixtures thereof, and the at least one gellant comprises at least one amide gellant.

9. The method according to claim 8, wherein the composition comprises the at least one curable wax and the at least one curable wax comprises a hydroxyl-terminated polyethylene wax functionalized with at least one curable group.

10. The method according to claim 9, wherein the at least one curable wax comprises a reaction product of a hydroxyl-terminated polyethylene wax and an acrylate.

11. The method according to claim 9, wherein the at least one gellant is a mixture comprising:

(I)

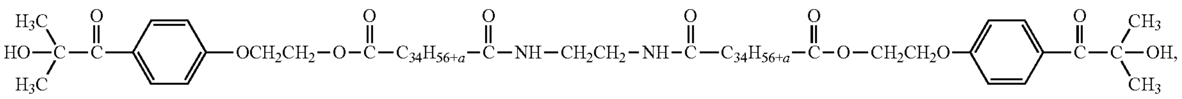

(II)

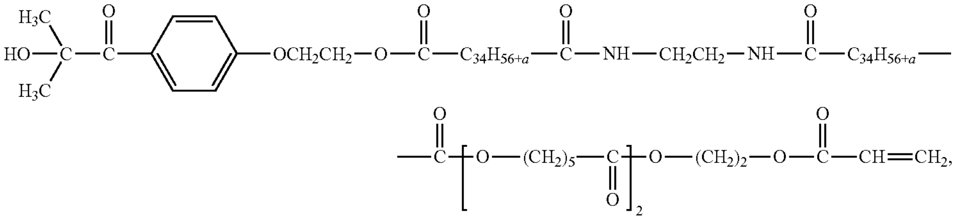

and (III)

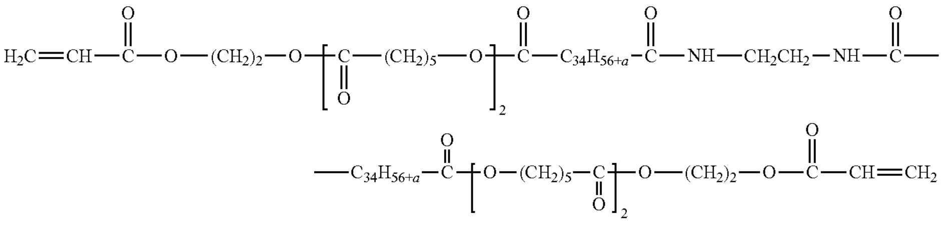

wherein $—C_{34}H_{56+a}$-represents a branched alkylene group that optionally includes unsaturations and cyclic groups, wherein a is an integer selected from 0 to 12.

12. A method of controlling gloss of an image, comprising:

pre-selecting a desired gloss level for the image;

forming the image over a substrate by digitally applying an ink composition and optionally an overcoat composition at least partially over the substrate by jetting, the ink composition or overcoat composition comprising at least one gellant, at least one curable monomer, optionally at least one curable wax and optionally at least one photoinitiator, wherein the ink composition or overcoat composition is curable upon exposure to ultraviolet radiation;

digitally providing a micro-roughness to one or more portions of the ink composition or overcoat composition by non-uniformly curing the ink composition or overcoat composition, the non-uniform curing being achieved by non-uniformly applying ultraviolet radiation to the ink composition or overcoat composition; and flood curing the ink composition or overcoat composition to complete a cure, thereby providing a gloss level to the image substantially equal to the desired gloss level for the image.

13. The method according to claim 12, wherein the micro-roughness is digitally provided by rastering a pulsed or continuous wave laser.

* * * * *